United States Patent
Kubono et al.

(10) Patent No.: US 9,179,018 B2
(45) Date of Patent: Nov. 3, 2015

(54) SCANNER-DRIVEN PUSH OPERATION REALIZED BY IMAGE FORMING APPARATUS HAVING NO AUXILIARY STORAGE DEVICE

(71) Applicant: KYOCERA Document Solutions Inc., Osaka (JP)

(72) Inventors: Koji Kubono, Osaka (JP); Masafumi Sato, Osaka (JP); Toshimitsu Morimoto, Osaka (JP); Hiroshi Manabe, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/139,088

(22) Filed: Dec. 23, 2013

(65) Prior Publication Data

US 2014/0185101 A1 Jul. 3, 2014

(30) Foreign Application Priority Data

Dec. 28, 2012 (JP) ................................. 2012-286965

(51) Int. Cl.
*G06F 3/12* (2006.01)
*H04N 1/32* (2006.01)
*H04N 1/00* (2006.01)

(52) U.S. Cl.
CPC ....... *H04N 1/00228* (2013.01); *H04N 1/00127* (2013.01); *H04N 1/00204* (2013.01); *H04N 1/00225* (2013.01); *H04N 1/00236* (2013.01); *H04N 1/00384* (2013.01); *H04N 2201/0013* (2013.01); *H04N 2201/0039* (2013.01); *H04N 2201/0041* (2013.01); *H04N 2201/0049* (2013.01); *H04N 2201/0094* (2013.01)

(58) Field of Classification Search
None
See application file for complete search history.

(56) References Cited

U.S. PATENT DOCUMENTS 6,459,499 B1 * 10/2002 Tomat .......................... 358/1.15
6,477,354 B1 * 11/2002 Roberts et al. .................... 455/7
(Continued)

FOREIGN PATENT DOCUMENTS

JP 2009-135575 A 6/2009

OTHER PUBLICATIONS

Extended European Search Report and Opinion for App. No. EP 13199579.7, mailed Jan. 7, 2015, 8 pages.

*Primary Examiner* — Madelein Nguyen
(74) *Attorney, Agent, or Firm* — McDonnell Boehnen Hulbert & Berghoff LLP (57) ABSTRACT

An image forming system includes an image forming apparatus and an information processing apparatus coupled to the network. The image forming apparatus stores, in a memory device, an information processing apparatus identifier that is assigned to a button of the image forming apparatus and transmits, to the information processing apparatus, press-down information of the button that includes the information processing apparatus identifier. The image forming apparatus additionally reads, if, in the information processing apparatus, it is determined the information processing apparatus identifier in the press-down information matches an information processing apparatus identifier stored within the information processing apparatus, a document image set in a scanner, in response to a scan execution request that is received from the information processing apparatus via the network. The image forming apparatus further transmits image data of the document image to the information processing apparatus via the network, and resets the press-down information.

18 Claims, 9 Drawing Sheets

(56) References Cited

U.S. PATENT DOCUMENTS

| | | | |
|---|---|---|---|
| 6,642,943 B1* | 11/2003 | Machida | 715/763 |
| 6,947,571 B1* | 9/2005 | Rhoads et al. | 382/100 |
| 7,012,706 B1* | 3/2006 | Hansen | 358/1.15 |
| 7,130,066 B1* | 10/2006 | Kanematu | 358/1.15 |
| 8,694,883 B2* | 4/2014 | Matsumoto | 715/273 |
| 2002/0135815 A1* | 9/2002 | Finn | 358/473 |
| 2003/0212779 A1* | 11/2003 | Boyter et al. | 709/223 |
| 2004/0233475 A1* | 11/2004 | Mikuni et al. | 358/1.15 |
| 2005/0063003 A1* | 3/2005 | Mishima et al. | 358/1.15 |
| 2006/0077444 A1* | 4/2006 | Lum et al. | 358/1.15 |
| 2006/0107039 A1 | 5/2006 | Sugiura et al. | |
| 2007/0041045 A1* | 2/2007 | Sato | 358/1.15 |
| 2007/0067413 A1 | 3/2007 | Nishio | |
| 2007/0141985 A1* | 6/2007 | Parkkinen et al. | 455/41.2 |
| 2009/0237728 A1* | 9/2009 | Yamamoto | 358/1.15 |
| 2010/0079781 A1* | 4/2010 | Yamamoto | 358/1.13 |
| 2011/0051190 A1* | 3/2011 | Abe | 358/1.15 |
| 2012/0120440 A1 | 5/2012 | Ueda | |
| 2012/0198083 A1* | 8/2012 | Killian | 709/228 |

* cited by examiner

SCANNER-DRIVEN PUSH OPERATION REALIZED BY IMAGE FORMING APPARATUS HAVING NO AUXILIARY STORAGE DEVICE

RELATED APPLICATIONS

This application is based upon, and claims priority to Japanese Patent Application No. 2012-286965, filed in the Japan Patent Office on Dec. 28, 2012, the entire contents of which are incorporated herein by reference.

FIELD

Unless otherwise indicated herein, the description in this field section or the background section is not prior art to the claims in this application and is not admitted to be prior art by inclusion in this section. The present disclosure generally relates to an image forming system, an image forming apparatus, and a transmission method for image data that realizes a scanner-driven push operation by the image forming apparatus having no auxiliary storage device.

BACKGROUND

In response to the operation of a user, a typical image forming apparatus causes a scanner to read a document image, and stores image data from the scanned document image in a hard disk (HDD) serving as an auxiliary storage device. The typical image forming apparatus notifies a personal computer (PC) of preparation completion, and reads out the image data from the hard disk to a memory buffer and transmits the image data to the PC, in response to an image data request from the PC. Owing to this configuration, a scanner-driven push operation is performed.

The image data read by the scanner-driven push operation is stored in a box (folder) within the HDD, and the image data is transmitted from the image forming apparatus to the PC.

However, it may be difficult for an inexpensive image forming apparatus to realize the scanner-driven push operation if the image forming apparatus has no HDD and a small memory capacity.

SUMMARY

The present disclosure relates to an image forming system, an image forming apparatus, and a transmission method for image data that realizes a scanner-driven push operation by the image forming apparatus having no auxiliary storage device.

An image forming system according to an embodiment of the present disclosure includes an image forming apparatus coupled to a network and an information processing apparatus coupled to the network.

The image forming apparatus includes a button, a memory device, a scanner, and a first control unit.

The first control unit is configured to perform a variety of functions. The first control unit is configured to store, in the memory device, an information processing apparatus identifier that is assigned to the button. The first control unit is also configured to transmit, to the information processing apparatus, press-down information that includes the information processing apparatus identifier corresponding to the button that is pressed-down, in response to a request for the press-down information of the button that is received from the information processing apparatus via the network. Further, the first control unit is configured to read a document image set in the scanner, in response to a scan execution request that is received from the information processing apparatus via the network. Further still, the first control unit is configured to transmit image data of the document image to the information processing apparatus via the network. Additionally, the first control unit is additionally configured to reset the press-down information.

The information processing apparatus includes an auxiliary storage device, a scanner driver, and a second control unit.

The second control unit is configured to perform a variety of functions. The second control unit is configured to periodically transmit the request for press-down information to the image forming apparatus via the network. The second control unit is also configured to determine whether or not the information processing apparatus identifier in the press-down information received from the image forming apparatus matches an information processing apparatus identifier stored within the information processing apparatus. Further, the second control unit is configured to transmit the scan execution request to the image forming apparatus via the scanner driver if the information processing apparatus identifier in the press-down information received from the image forming apparatus matches the information processing apparatus identifier stored within the information processing apparatus. Additionally, the second control unit is configured to store, in the auxiliary storage device, image data that is received from the image forming apparatus via the scanner driver.

Additional features and advantages are described herein, and will be apparent from the following Detailed Description and the figures.

BRIEF DESCRIPTION OF FIGURES

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

[First Embodiment]

Figure 1:
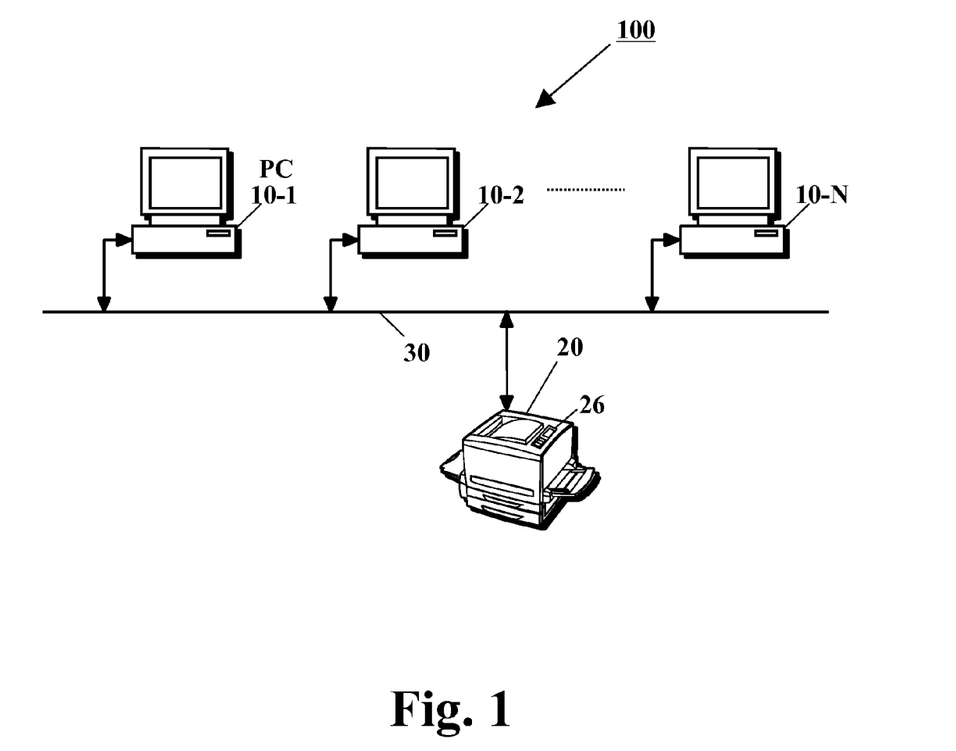
FIG. 1 is a schematic diagram illustrating a configuration of an image forming system according to a first embodiment of the present disclosure.

FIG. 1 is a schematic diagram illustrating the configuration of the image forming system 100 according to a first embodiment of the present disclosure.

In the image forming system 100, a plurality of information processing apparatuses, for example, personal computers (PCs) 10-1 to 10-N, whose number is N, and an image forming apparatus 20 are coupled to a network 30. In particular, the image forming apparatus 20 is inexpensive, and has no auxiliary storage device.

Figure 2:
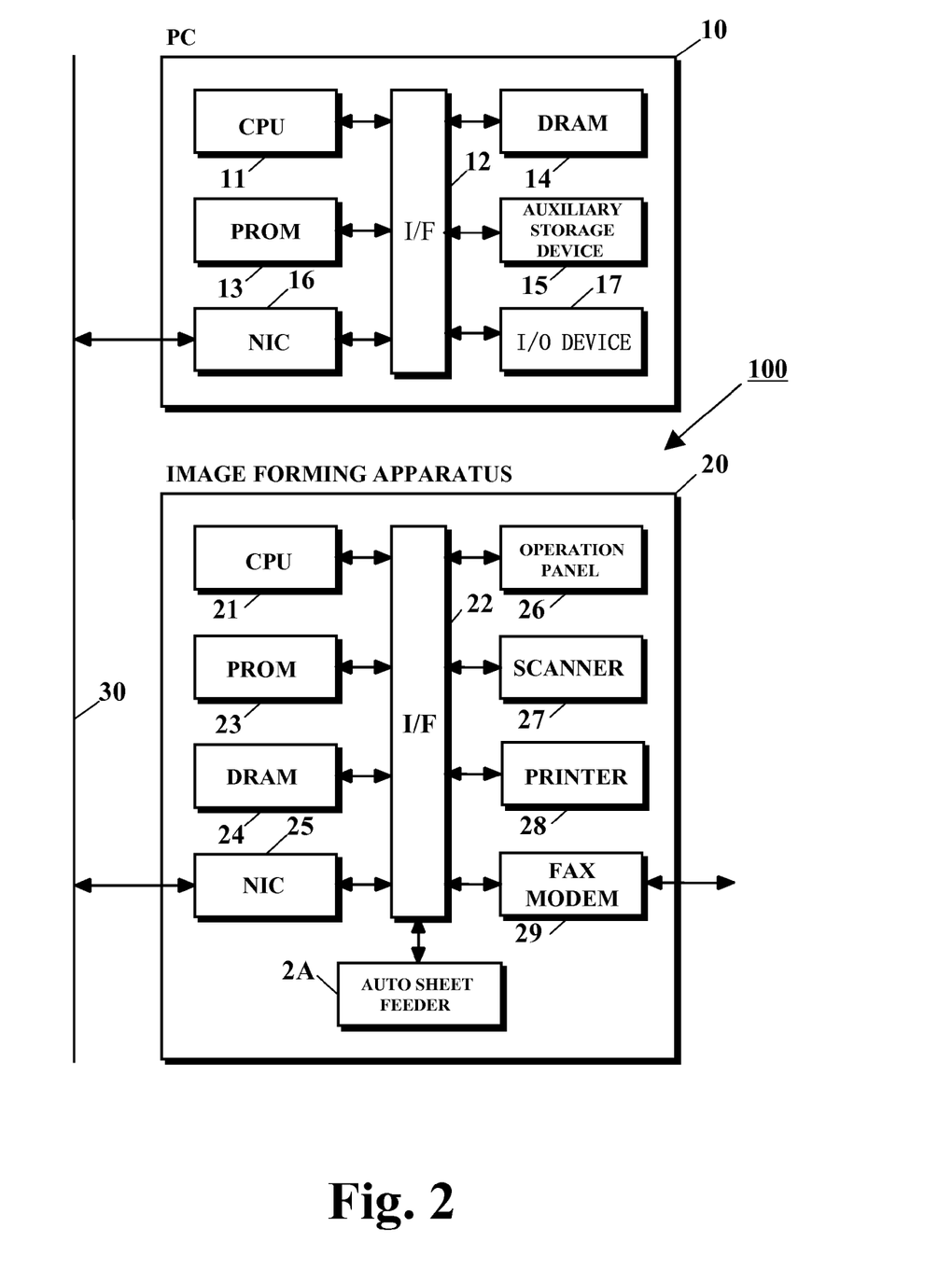
FIG. 2 is a block diagram illustrating hardware configurations of an information processing apparatus (e.g. a PC) and an image forming apparatus in the image forming system.

FIG. 2 is a block diagram illustrating the hardware configurations of a PC 10 and the image forming apparatus 20 in the image forming system 100.

The PC (information processing apparatus) 10 is a personal computer, and a central processing unit (CPU) 11 is coupled to a programmable read only memory (PROM) 13, a dynamic random access memory (DRAM) 14, an auxiliary storage device 15, a network interface (NIC) 16, and an input-output (I/O) device 17 through an interface 12. In FIG. 2, interface 12 may be any type of interface that may be used to allow communication among the CPU 11, the PROM 13, the DRAM 14, the NIC 16, and the I/O device 17.

The PROM 13 is, for example, a flash memory device, and a basic input/output system (BIOS) is stored therein. The DRAM 14 is used as a main storage device. An operating system (OS) and various kinds of drivers and applications may be stored in the auxiliary storage device 15.

In the image forming apparatus 20, via an interface 22, a CPU 21 is coupled to a PROM 23, a DRAM 24, a network interface card (NIC) 25, an operation panel 26, a scanner 27, a printer 28, a facsimile (FAX) modem 29, and an auto sheet feeder 2A. In FIG. 2, interface 22 may be any type of interface that may be used to allow communication among the CPU 11, the PROM 13, the DRAM 14, the NIC 16, and the I/O device 17.

The PROM 23 is, for example, a flash memory device, and may store therein a BIOS, an OS, various kinds of drivers, and various applications that run on the image forming apparatus. The DRAM 24 is used as a main storage device. The network interface 25 is coupled to the network 30. The scanner 27 is used for digitizing an image on a paper medium, and the file thereof may be used for printing, facsimile transmission, or file transmission. The printer 28 includes a print engine, a paper feeding unit, a transport unit, and a paper ejection unit, which perform various tasks to paper. Bitmap data stored on the DRAM 24 is provided to the printer 28, and the printer 28 forms an electrostatic latent image on a photoconductive drum on the basis of this data, develops the electrostatic latent image using toner, transfers and fixes a toner image to a sheet of paper, and ejects the sheet of paper.

Figure 3:
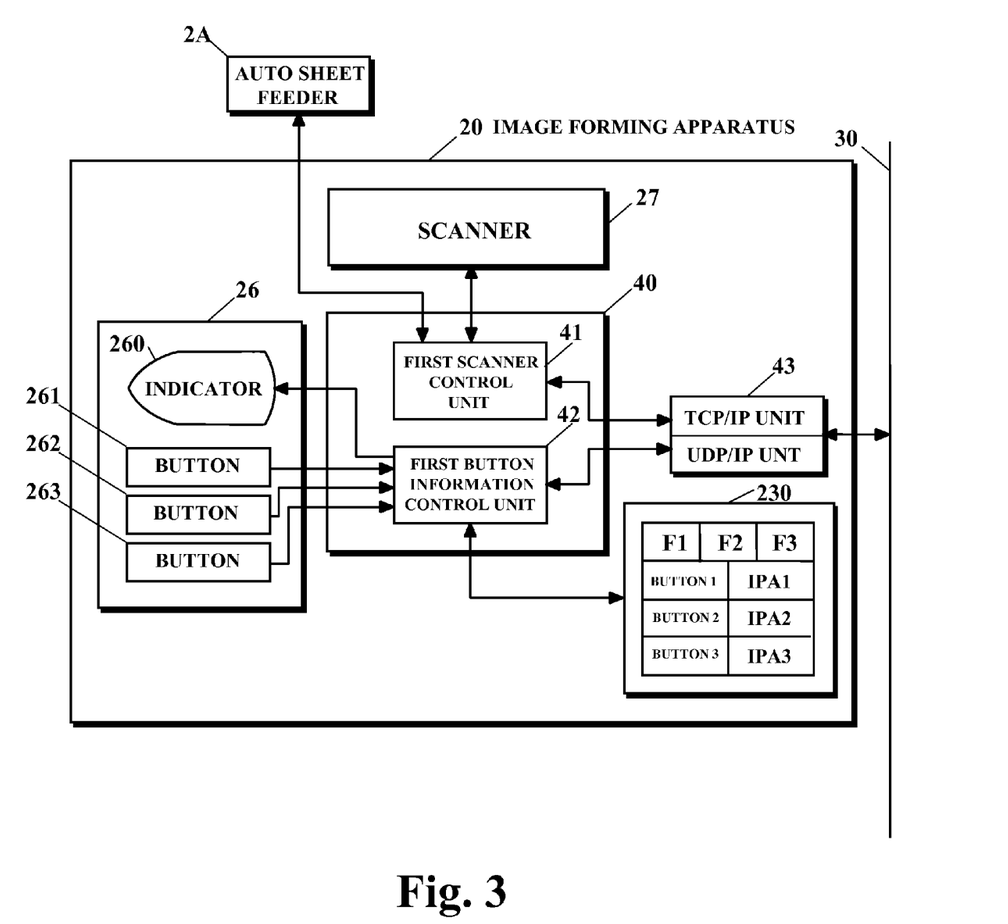
FIG. 3 is a block diagram illustrating a functional configuration relating to a scanner function of the image forming apparatus.

FIG. 3 is a block diagram illustrating the functional configuration relating to a scanner function of the image forming apparatus 20.

A first control unit 40 includes a first scanner control unit 41 for the scanner 27 and the auto sheet feeder 2A, and a first button information control unit 42 for the operation panel 26 and a button information storage unit 230 within the PROM 23.

The operation panel 26 includes buttons 261 to 263 used for indirectly starting push scan. Furthermore, the operation panel 26 includes an indicator 260 displaying the button name of a button pressed down from among the buttons 261 to 263.

The button information storage unit 230 stores therein button information. The button information includes at least flags F1 to F3 indicating whether or not the buttons 261 to 263 have been pressed down, respectively, IP addresses IPA1 to IPA3 serving as PC identifiers assigned to the buttons 261 to 263, respectively, and button names (hereinafter, the button names of the buttons 261 to 263 are buttons 1 to 3, respectively) assigned to the buttons 261 to 263, respectively.

When a button 26$i$ (i: one of 1 to 3) has been pressed down, the first button information control unit 42 refers to the button information storage unit 230, and causes the indicator 260 to display the button name, "button i", thereof and sets flag Fi within the button information storage unit 230. In addition, in response to scan termination from the scanner 27 via the first scanner control unit 41, the first button information control unit 42 resets the flag Fi that is displayed in the indicator 260 and corresponds to the "button i" and clears the indicator 260.

A first communication unit 43 includes the network interface 25 in FIG. 2 and a communication protocol stack for the OS. This communication protocol stack includes a TCP/IP unit and a UDP/IP unit. The first communication unit 43 individually sorts pieces of information received from a TCP/IP unit and a UDP/IP unit in the PC 10, into the first scanner control unit 41 and the first button information control unit 42.

The TCP/IP unit in the first communication unit 43 receives a command from a Tool Without An Interesting Name (TWAIN) driver in the PC 10, and sends back the response thereto from the first scanner control unit 41 to the PC 10. In addition, the UDP/IP unit in the first communication unit 43 receives, from the PC 10, an acquisition request for the IP addresses IPA1 to IPA3 (the press-down information). The acquisition request is based on a Simple Network Management Protocol (SNMP), and sends back, to the PC 10, the button information from the first button information control unit 42, the button information corresponding to this request and being based on the SNMP.

In response to a TWAIN command (API command) from the first communication unit 43, the first scanner control unit 41 sets, for the scanner 27, an image reading condition such as resolution. In addition, the first scanner control unit 41 causes the auto sheet feeder 2A to be driven and feed a document, causes the scanner 27 to read and convert the image thereof into image data, and sends back the image data to a request source via the TCP/IP unit in the first communication unit 43.

The first button information control unit 42 includes an SNMP agent on the first communication unit 43, and control programs on the operation panel 26 and the button information storage unit 230, which serve as processing targets. The button information storage unit 230 is a portion of a management information base (MIB).

Figure 4:
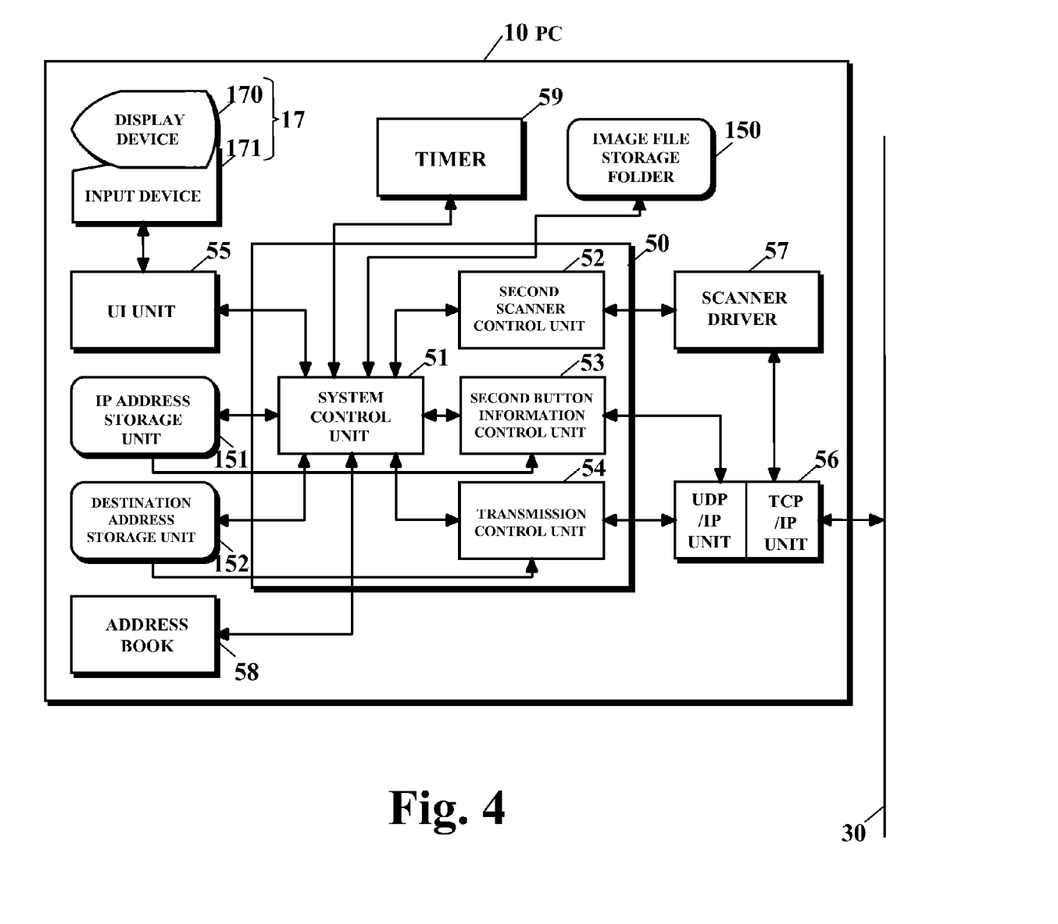
FIG. 4 is a block diagram illustrating a functional configuration relating to a scanner function of the PC.

FIG. 4 is a block diagram illustrating the functional configuration relating to the scanner function of the PC 10.

Blocks 150, 151, and 152 in FIG. 4 are stored within the auxiliary storage device 15 in FIG. 2. Data held in the IP address storage unit 151 is data written into a specified leaf node of the registry of the OS at the time of a communication setting.

The input-output (I/O) device 17 includes a display device 170 and an input device 171. The input device 171 includes, for example, a keyboard and a pointing device.

A second control unit 50 includes a system control unit 51 controlling the units within PC 10, a second scanner control unit 52 controlling the image forming apparatus 20, a second button information control unit 53 controlling the button information of the image forming apparatus 20, and a transmission control unit 54 transmitting the image file of a scan result.

In response to an operation performed on the input device 171 by a user, the user interface (UI) unit 55 causes the display device 170 to display a menu relating to image scanning. In each menu, in response to an operation performed on the input device 171 by the user, the user interface unit 55 notifies the system control unit 51 of an instruction and a setting value (selection) which has been input. The system control unit 51 performs a process in accordance with a notification result.

In the same way as the first communication unit 43, a second communication unit 56 includes the network interface 16 in FIG. 2 and a communication protocol stack for the OS. This communication protocol stack includes a TCP/IP unit and a UDP/IP unit. The second communication unit 56 individually sorts pieces of information received from the TCP/IP unit and the UDP/IP unit in the image forming apparatus 20, into a scanner driver 57 and the second button information control unit 53. The second communication unit 56 further includes the UDP/IP unit located above the TCP/IP unit so as to correspond to the transmission control unit 54, and receives a transmission request from the transmission control unit 54 using this UDP/IP unit.

In response to a scan execution instruction from the system control unit 51, the second scanner control unit 52 transmits a scan execution request to the image forming apparatus 20 via the scanner driver 57 serving as the TWAIN driver, the TCP/IP unit in the second communication unit 56, and the network 30.

The second button information control unit 53 includes an SNMP manager on the second communication unit 56, and a control program on the system control unit 51.

Figure 5:
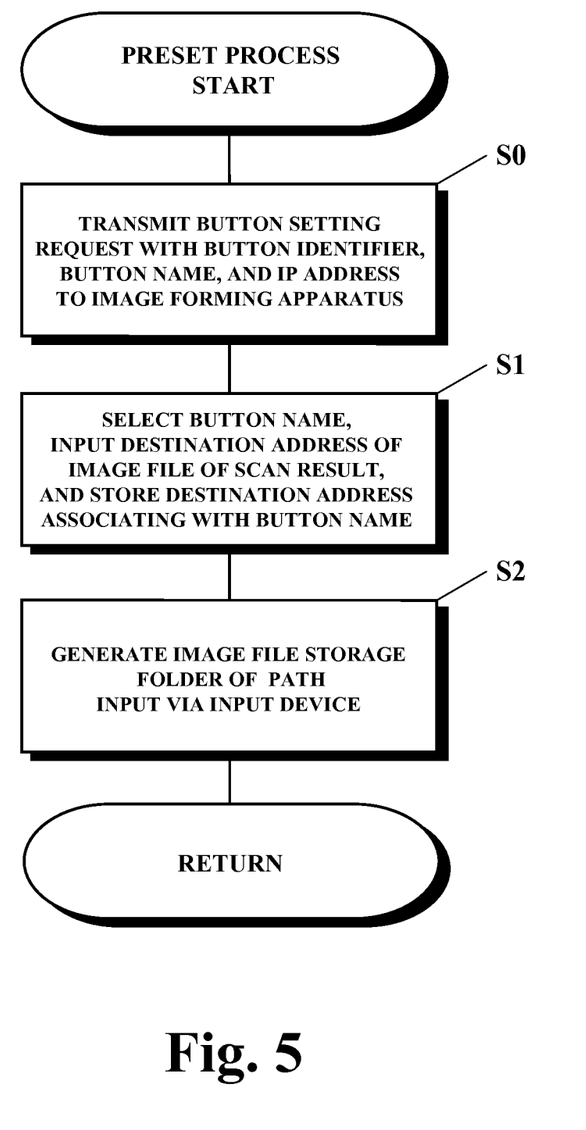
FIG. 5 is a flowchart illustrating process performed by a UI unit and a system control unit in the PC in response to an operation of a user before the PC causes an image forming apparatus to perform image scanning.

FIG. 5 is a flowchart illustrating process performed by the UI unit 55 and the system control unit in the PC in response to the operation of the user before the PC causes the image forming apparatus to perform image scanning The flowchart indicates a preset process performed by the user interface unit 55 and the system control unit 51 before the user presses down one of the buttons 261 to 263 in the image forming apparatus 20.

In a step S0, the user selects one 26i (i is one of 1 to 3) from among the buttons 261 to 263 in the PC 10 via the input device 171, the buttons 261 to 263 being displayed in the display device 170, and sets the name thereof The user interface unit 55 notifies the system control unit 51 of this selection. In response to this, the system control unit 51 specifies the identifier i and button name of this button 26i and an IP address within the IP address storage unit 151, and instructs the second button information control unit 53 to perform a button setting. In response to this, the second button information control unit 53 transmits a button setting request accompanied with the button identifier i, the button name, and the IP address to the first button information control unit 42 via the second communication unit 56 and the first communication unit 43 in the image forming apparatus 20.

In response to the above-described transmission, the first button information control unit 42 overwrites and sets a button name within the button information storage unit 230 with "button i", the button name corresponding to the button identifier i, and overwrites and sets the IP address to an IP address IPAi.

In a step S1, the user operates the input device 171, selects a button name, and inputs the transmission destination address of the image file of a scan result. The user interface unit 55 notifies the system control unit 51 of this transmission destination address along with this button name. In response to this, the system control unit 51 stores, in the destination address storage unit 152, this transmission destination address associated with the address of this button name. This transmission destination address includes a file transfer protocol such as a File Transfer Protocol (FTP), a Server Message Block (SMB), or a Simple Mail Transfer Protocol (SMTP).

In addition, the input of the transmission destination address may also be performed by specifying data within an address book 58.

In a step S2, the user operates the input device 171 and inputs the path of a folder within the auxiliary storage device 15. The folder then stores therein the image file of a scan result. The user interface unit 55 notifies the system control unit 51 of this input. In response to this, the system control unit 51 generates the image file storage folder 150 of this path. In addition, the path of a scan image file storage folder may also be set with any button name.

The processing operations in the steps S0 to S2 are selectively performed in response to an operation performed on the input device 171 by the user. In addition, from among the buttons 261 to 263, one or more buttons are set.

A timer 59 includes a hardware timer within the CPU 11 in FIG. 2, which is utilized by a software interval timer of the OS. Every time five seconds has elapsed, for example, the timer 59 causes a time-up event to occur for the system control unit 51. In response to this, the system control unit 51 instructs the second button information control unit 53 to acquire the button information. In response to this instruction, via the second communication unit 56 and the network 30, the second button information control unit 53 requests the first button information control unit 42 in the image forming apparatus 20 to acquire the button information. The timer 59 is activated at the time of the activation of the second control unit 50, and halted at the time of the termination of the second control unit 50.

After receiving the button information from the image forming apparatus 20 via the second communication unit 56, the second button information control unit 53 determines, with respect to each of i=1 to 3, whether or not the IP address IPAi corresponding to the flag Fi coincides with an IP address stored the IP address storage unit 151 if the flag Fi has been set. If IPAi corresponding to Fi coincides with the IP address stored at the IP address storage unit 151, the second button information control unit 53 informs the system control unit 51 to that effect. In response to this, the system control unit 51 gives the scan execution instruction to the second scanner control unit 52.

Figure 6:
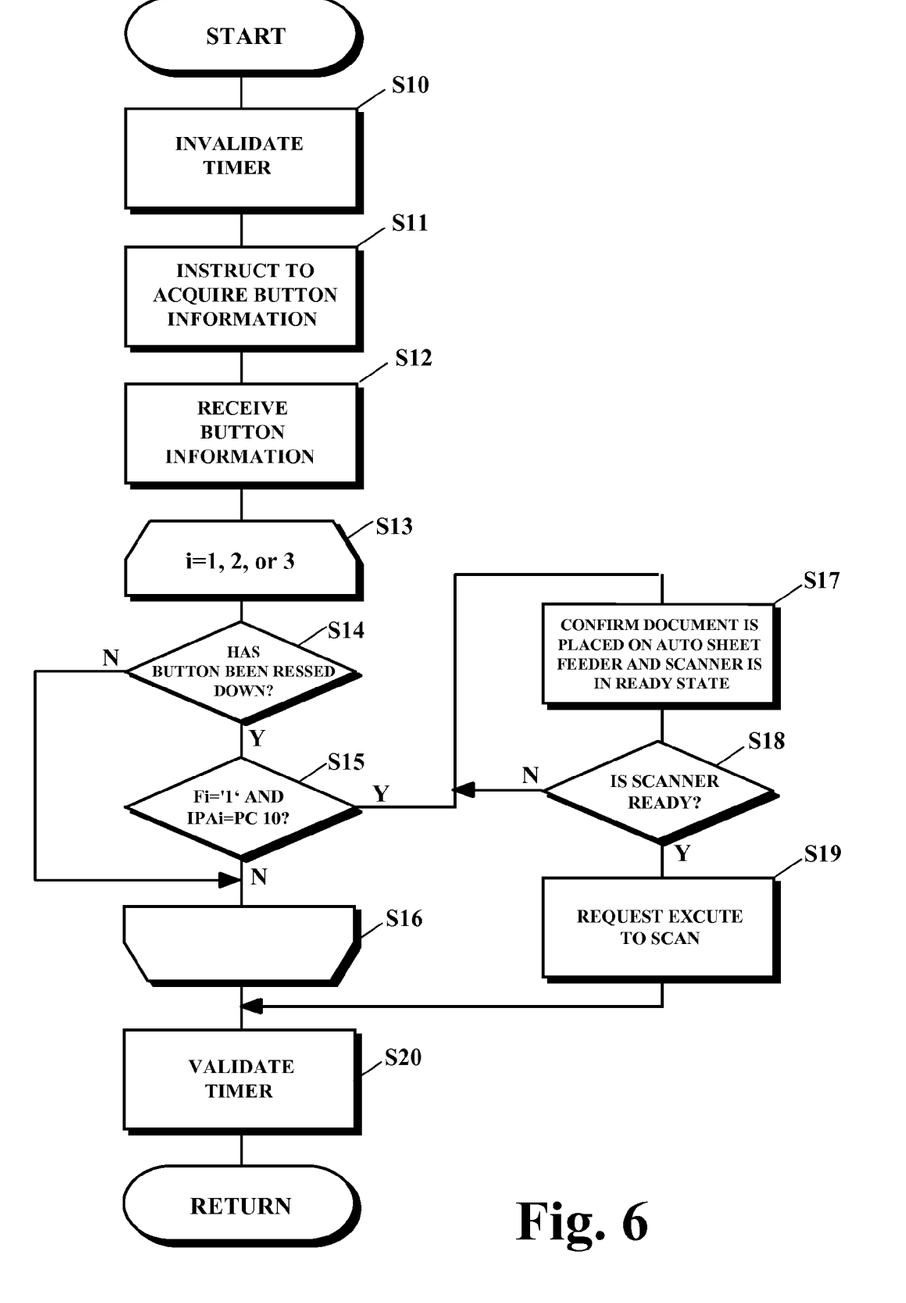
FIG. 6 is a flowchart illustrating process performed by the system control unit in the PC and started in response to an occurrence of a time-up event.

FIG. 6 is a flowchart illustrating process performed by the system control unit 51 in the PC 10 and started in response to the occurrence of a time-up event.

In a step S10, the system control unit 51 invalidates the timer 59, and suppresses the occurrence of a time-up event.

In a step S11, via the second button information control unit 53, the system control unit 51 instructs the second button information control unit 53 to acquire the button information.

When, in a step S12, having received the button information with respect to each of i=1 to 3 of the flag Fi thereof and the IP address IPAi, the second button information control unit 53 repeats processing operations ranging from a step S13 to a step S16 until affirmative determination is performed in the step S15.

In the step S14, it is determined whether or not a button has been pressed down. In the step S15, if it is determined that the Fi='1' and the IPA satisfies the IPAi=PC 10, the process proceeds to a step S17. In addition to this, if, with respect to all of i=1 to 3, this condition is not satisfied, the process proceeds to the step S20

In the step S17, the second button information control unit 53 returns control to the system control unit 51, and via the second scanner control unit 52, the system control unit 51 requests the first scanner control unit 41 in the image forming apparatus 20 to confirm whether or not a document is placed on the auto sheet feeder 2A and the scanner 27 is in a ready state. In response to this request, the first scanner control unit 41 confirms whether or not the scanner 27 is in a ready state and a sensor has detected that a document is placed on the auto sheet feeder 2A, and the first scanner control unit 41 sends back the result to the system control unit 51 via the second scanner control unit 52.

In a step S18, if this response indicates that it is possible to scan, the system control unit 51 proceeds to a step S19, and if this is not the case, the system control unit 51 returns to the step S17. Using another timer, this loop processing operation in the steps S17 and S18 is performed periodically, for example, every one second.

In the step S19, via the second scanner control unit 52 and the scanner driver 57, the first scanner control unit 41 in the image forming apparatus 20 is requested to execute scan.

In response to this, the first scanner control unit 41 causes the auto sheet feeder 2A to be driven to feed a document, and causes the scanner 27 to read and convert the scanned image into image data. The first scanner control unit 41 causes the image data to be stored in a buffer area within the DRAM 24, and sends back the image data to the second scanner control unit 52 in units of pages or in units of blocks into which a page is divided, in accordance with a buffer size. The image data is stored in a buffer area within the DRAM 14.

When image scanning for all pages has been completed or when the user has pressed down a scan termination button on the operation panel 26 (not illustrated) the first scanner control unit 41 resets the flag Fi corresponding to the button name, "button i", displayed in the indicator 260, and clears the display of the button name. The first scanner control unit 41 causes an image scanning completion event to occur for the second scanner control unit 52, which in turn notifies the system control unit 51 that image scanning has completed.

In a step S20, the timer 59 is validated, the suppression of the occurrence of the time-up event is cancelled, and the process is returned.

Figure 7:
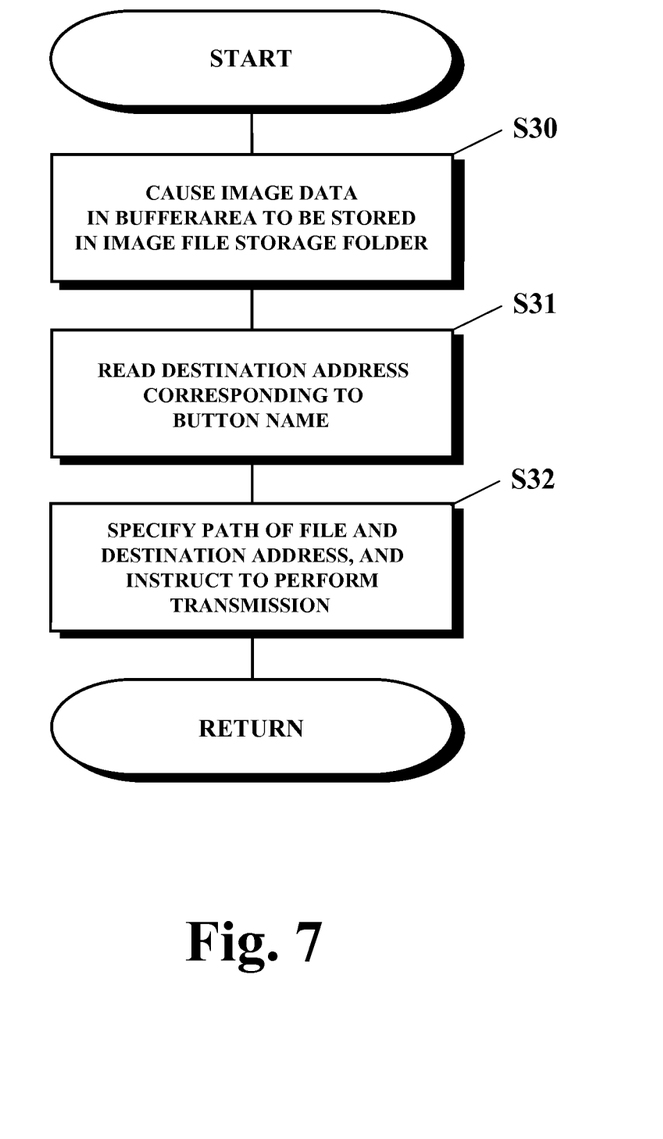
FIG. 7 is a flowchart illustrating process performed in the system control unit in the PC and started in response to a notice of a scan completion event.

FIG. 7 is a flowchart illustrating process performed in the system control unit 51 in the PC 10 and started in response to the notice of a scan completion event.

In a step S30, the system control unit 51 causes the image data in the buffer area to be stored in the image file storage folder 150, as a file.

In a step S31, the system control unit 51 reads a destination address corresponding to the button name, "button i", within the destination address storage unit 152.

In a step S32, if this destination address exists (alternatively, if the destination address exists and the necessity of transmitting has been checked), the system control unit 51 specifies the path of the file and the destination address thereof for the transmission control unit 54, and instructs the transmission control unit 54 to perform transmission.

In response to this, the transmission control unit 54 transmits this image file to the destination address via the second communication unit 56, in accordance with a protocol indicated by a protocol unit at the destination address. In addition, a transmission time may be set with respect to each button name, and transmission may also be performed by waiting for a transmission time corresponding to a button name.

According to the present first embodiment, when the user has placed a document on the auto sheet feeder 2A or a platen in the image forming apparatus 20 and pressed down a button to which an IP address serving as the identifier of the PC 10 has been preliminarily assigned, from among the buttons 261 to 263, the PC 10 transmits a scan execution request to the image forming apparatus 20 via the scanner driver 57. Since the auxiliary storage device 15 in the PC 10 is caused to store therein image data received from the image forming apparatus 20 via the scanner driver 57, even if the image forming apparatus 20 includes no auxiliary storage device, it may become possible to realize the same scanner-driven push operation as if the image forming apparatus 20 includes an auxiliary storage device.

In addition, even if the image forming apparatus 20 includes no auxiliary storage device, it may become possible to realize the automatic transfer of the image file of a scan result to a transmission destination preliminarily set with respect to each button, in the same way as when the image forming apparatus 20 includes an auxiliary storage device.

Furthermore, it may be possible for the user to set, from the PC 10 via the network 30, an association between the buttons 261 to 263 in the image forming apparatus 20 and the PC 10. Therefore, even if the function of the image forming apparatus is enhanced, it may be possible to further simplify the configuration of the image forming apparatus and achieve price reduction.

In addition, since it may be possible for the user to set the transmission destination of the image file of a scan result via the input device 171 in the PC 10, even if the function of the image forming apparatus is enhanced, it may be possible to further simplify the configuration of the image forming apparatus and achieve price reduction.

[Second Embodiment]

Figure 8:
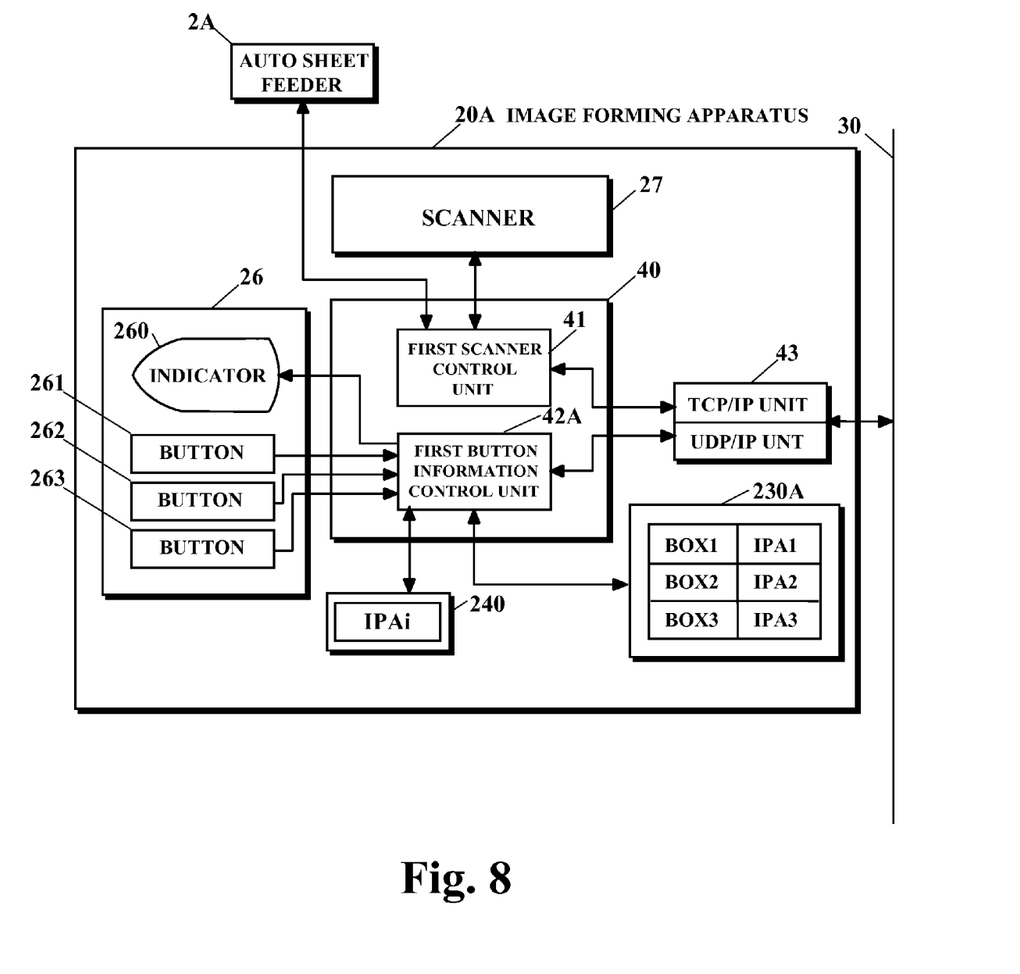
FIG. 8 is a block diagram illustrating a functional configuration relating to a scanner function of an image forming apparatus, according to a second embodiment of the present disclosure.

FIG. 8 is a block diagram illustrating the functional configuration relating to the scanner function of an image forming apparatus 20A, according to a second embodiment of the present disclosure.

In the second embodiment, a button information storage unit 230A is included where the flags F1 to F3 are omitted from the button information storage unit 230 in FIG. 3, and a pressed-down button information storage unit 240 is included within the DRAM 24. The initial value of the pressed-down button information storage unit 240 is NULL or empty. In response to the user pressing down the button 26i, a first button information control unit 42A copies an IP address IPAi within the button information storage unit 230A onto the pressed-down button information storage unit 240. In addition, the other configuration elements of the image forming apparatus 20A and the functions thereof are the same as the configuration elements of the image forming apparatus 20 in the first embodiment and the functions thereof.

Figure 9:
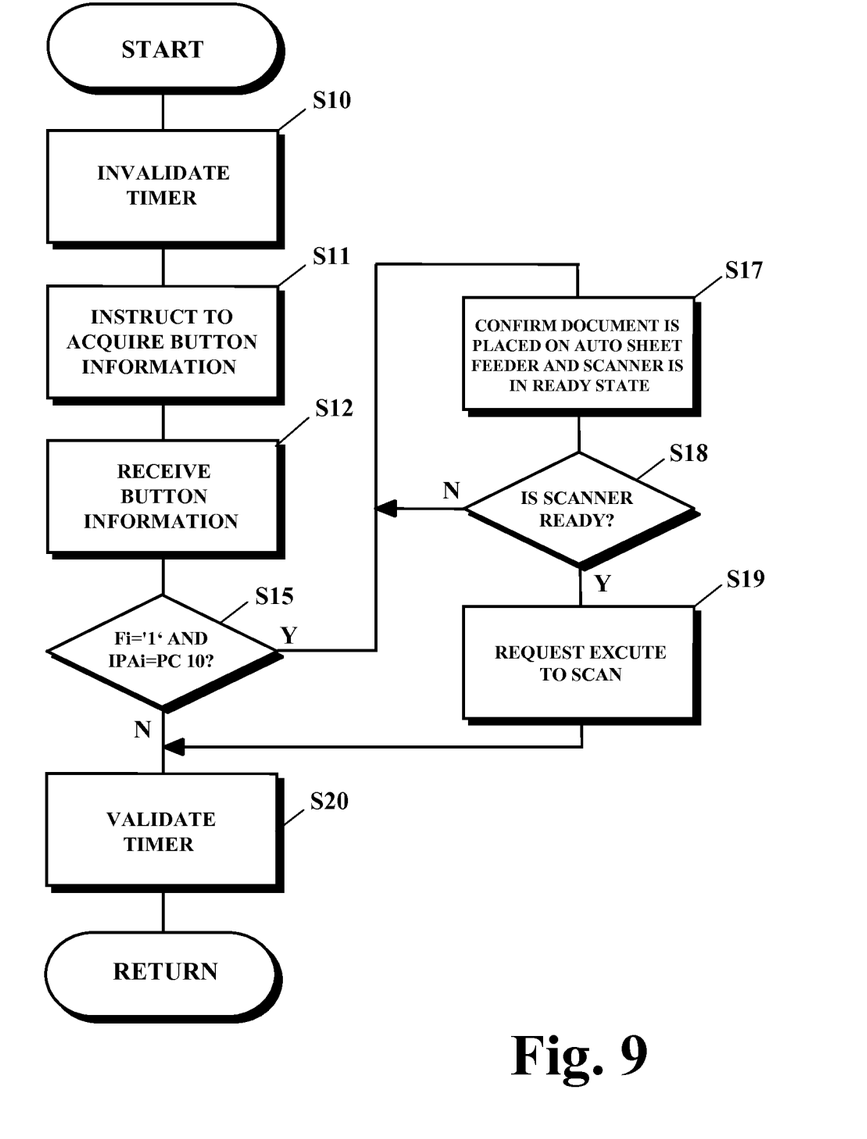
FIG. 9 is a flowchart illustrating process performed in the system control unit in the PC and started in response to the occurrence of the time-up event, according to the second embodiment of the present disclosure.

FIG. 9 is a flowchart illustrating process performed in the system control unit in the PC 10 and started in response to the occurrence of the time-up event, according to the second embodiment of the present disclosure.

In response to a press-down information acquisition request from the PC 10 in a step S11, the first button information control unit 42A sends back the IP address IPAi in the pressed-down button information storage unit 240.

In a step S15, if the IP address IPAi coincides with the IP address IPA of the PC 10, the button information control unit 53 proceeds to a step 517, and if this is not the case, the button information control unit 53 proceeds to a step S20.

When image scanning for all pages has been completed, the first button information control unit 42A clears the display of the indicator 260, and clears the content of the pressed-down button information storage unit 240 (NULL or empty).

The other control of the flowchart illustrated in FIG. 9 is the same as the control of the flowchart illustrated in FIG. 6 in the first embodiment.

According to the present second embodiment, processing operations in the first button information control unit 42A and the scanner driver 57 become easier than in the processing operations in the first embodiment.

While various aspects and embodiments have been disclosed herein, other aspects and embodiments are possible. Other designs may be used in which the above-described components are each present.

For example, in the first and second embodiments, when the steps S17 and S18 are omitted, the time-up interval of the timer T is shortened, the flags F1 to F3 are not used, and the image forming apparatus 20 or 20A has received the press-down information acquisition request, it may also be directly detected which of the buttons 261 to 263 is pressed down.

In addition, the IP addresses IPA1 to IPA3 illustrated in FIG. 3 or FIG. 8 and the IP address storage unit 151 in FIG. 4 may also adopt configurations in which unique device IDs (UDIDs) are used in place of the IP addresses.

In addition, the scanner driver 57, the first communication unit 43, and the second communication unit 56 are not limited to the protocols described in the first embodiment, and may also adopt configurations in which another protocol is used.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming system comprising:
    an image forming apparatus coupled to a network, wherein the image forming apparatus includes a button, a memory device, a scanner, and a first control unit, wherein the first control unit is configured to
        store, in the memory device, an information processing apparatus identifier that is assigned to the button,
        transmit, to the information processing apparatus, press-down information, wherein the press-down information includes the information processing apparatus identifier corresponding to the button, in response to a request for the press-down information of the button that is received from the information processing apparatus via the network,
        read a document image set in the scanner in response to a scan execution request that is received from the information processing apparatus via the network,
        transmit image data of the document image to the information processing apparatus via the network, and
        reset the press-down information; and
    an information processing apparatus coupled to the network, wherein the information processing apparatus includes an auxiliary storage device, a TWAIN driver as a scanner driver, a transmission destination address setting unit, and a second control unit,
    wherein the transmission destination address setting unit is configured to store, in the auxiliary storage device, a transmission destination address corresponding to the button, and
    wherein the second control unit is configured to
        periodically transmit the request for press-down information to the image forming apparatus via the network,
        determine whether or not the information processing apparatus identifier in the press-down information received from the image forming apparatus matches an information processing apparatus identifier stored within the information processing apparatus,
        transmit the scan execution request to the image forming apparatus via the scanner driver if the information processing apparatus identifier in the press-down information received from the image forming apparatus matches the information processing apparatus identifier stored within the information processing apparatus,
        store, in the auxiliary storage device, image data that is received from the image forming apparatus via the scanner driver,
        acquire the transmission destination address from the auxiliary storage device, and
        transmit the image data that is stored in the auxiliary storage device to the transmission destination address.

2. The image forming system according to claim 1, wherein the information processing apparatus further includes an input unit, and
wherein the transmission destination address setting unit is configured to set the transmission destination address based on an input received from the input unit.

3. The image forming system according to claim 1, wherein the information processing apparatus further includes an input unit,
wherein an information processing apparatus identifier is received from the input unit,
wherein the second control unit is further configured to transmit, to the first control unit, the information processing apparatus identifier that is received from the input unit, and
the first control unit is further configured to assign, to the button, the information processing apparatus identifier that is input via the input unit.

4. The image forming system according to claim 1, wherein the press-down information includes a flag indicating whether or not the button is pressed down.

5. The image forming system according to claim 1, wherein the image forming apparatus further includes an indicator for displaying a name of the button.

6. The image forming system according to claim 1, wherein the image forming apparatus further includes a communication unit for receiving the scan execution request from the scanner driver and transmitting the image data of the document image back to the information processing apparatus.

7. The image forming system according to claim 1, wherein the information processing apparatus further includes a timer used for the periodic transmission of the request for press-down information to the image forming apparatus via the network.

8. An image forming apparatus coupled to an information processing apparatus and a network, wherein the image forming apparatus comprises a button, a memory device, a scanner, and a control unit, wherein the control unit is configured to
- store, in the memory, an information processing apparatus identifier that is assigned to the button,
- transmit, to the information processing apparatus, press-down information, wherein the press-down information includes including the information processing apparatus identifier corresponding to the button, in response to a request for the press-down information of the button that is received from the information processing apparatus via the network,
- read a document image set in the scanner in response to a scan execution request that is received via a TWAIN driver as a scanner driver in the information processing apparatus via the network, if, in the information processing apparatus, it is determined that the information processing apparatus identifier in the press-down information matches an information processing apparatus identifier stored within the information processing apparatus,
- transmit image data of the document image to the information processing apparatus via the network, and
- reset the press-down information.

9. The image forming apparatus according to claim 8,
- wherein the information processing apparatus receives an information processing apparatus identifier from an input unit within the information processing apparatus,
- wherein the image forming apparatus receives, via the network, the information processing apparatus identifier from the input unit within the information processing apparatus, and
- wherein the received information processing apparatus identifier from the input unit within the information processing apparatus is assigned to the button.

10. The image forming apparatus according to claim 8,
- wherein the press-down information includes a flag indicating whether or not the button is pressed down.

11. The image forming apparatus according to claim 8, further comprising an indicator for displaying a name of the button.

12. The image forming apparatus according to claim 8, further comprising a communication unit for receiving the scan execution request from the scanner driver and transmitting the image data of the document image back to the information processing apparatus.

13. A transmission method for image data performed by an image forming system, wherein the image forming system includes an image forming apparatus coupled to a network and an information processing apparatus coupled to the network, wherein the transmission method comprises:
- via the image forming apparatus,
  - storing, in a memory device, an information processing apparatus identifier that is assigned to a button of the image forming apparatus,
  - transmitting, to the information processing apparatus, press-down information, wherein the press-down information includes the information processing apparatus identifier corresponding to the button, in response to a request for the press-down information of the button that is received from the information processing apparatus via the network,
  - reading a document image set in a scanner, in response to a scan execution request that is received from the information processing apparatus via the network,
  - transmitting image data of the document image to the information processing apparatus via the network, and
  - resetting the press-down information; and
- via the information processing apparatus,
  - storing, in an auxiliary storage device, a transmission destination address corresponding to the button,
  - periodically transmitting the request for press-down information to the image forming apparatus via the network,
  - determining whether or not the information processing apparatus identifier in the press-down information received from the image forming apparatus matches the information processing apparatus as a destination,
  - transmitting the scan execution request to the image forming apparatus via a TWAIN driver as a scanner driver if the information processing apparatus identifier in the press-down information received from the image forming apparatus matches an information processing apparatus identifier stored within the information processing apparatus,
  - storing, in the auxiliary storage device, image data that is received from the image forming apparatus via the scanner driver,
  - acquiring the transmission destination address from the auxiliary storage device, and
  - transmitting, to the transmission destination address, the image data that is stored in the auxiliary storage device.

14. The transmission method according to claim 13, further comprising:
- via the information processing apparatus,
  - transmitting, to the image forming apparatus, an information processing apparatus identifier that is received from an input unit; and
- via the image forming apparatus,
  - assigning, to the button, the information processing apparatus identifier that is received an input unit.

15. The transmission method according to claim 13, wherein
- the press-down information includes a flag indicating whether or not the button is pressed down.

16. The transmission method according to claim 13, further comprising, via the image forming apparatus, displaying, on an indicator, a name of the button.

17. The transmission method according to claim 13, further comprising, via the image forming apparatus, receiving, on a communication unit, the scan execution request from the scanner driver and transmitting the image data of the document image back to the information processing apparatus.

18. The transmission method according to claim 13, further comprising, via the information processing apparatus, generating a periodic transmission, using a timer, of the request for press-down information to the image forming apparatus via the network.

* * * * *